United States Patent
Saw-Chu et al.

(10) Patent No.: US 6,880,077 B2
(45) Date of Patent: Apr. 12, 2005

(54) ENABLING COMMUNICATION BETWEEN VIDEO BIOS AND GRAPHICS DRIVERS

(75) Inventors: Kim L. Saw-Chu, Milpitas, CA (US); David Wyatt, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 619 days.

(21) Appl. No.: 09/967,735

(22) Filed: Sep. 28, 2001

(65) Prior Publication Data

US 2003/0065850 A1 Apr. 3, 2003

(51) Int. Cl.$^7$ ................................................ G06F 13/00
(52) U.S. Cl. .......................... 713/2; 713/100; 710/10; 710/104; 702/119; 375/219; 375/220
(58) Field of Search ........................ 713/2, 100; 710/10, 710/104; 702/119; 375/219, 220

(56) References Cited

U.S. PATENT DOCUMENTS

| | | | | |
|---|---|---|---|---|
| 4,319,323 A | * | 3/1982 | Ermolovich et al. | 711/100 |
| 5,434,976 A | * | 7/1995 | Tan et al. | 709/234 |
| 6,615,288 B1 | * | 9/2003 | Herzi | 710/10 |
| 6,697,033 B1 | * | 2/2004 | Leung et al. | 345/5 |

* cited by examiner

Primary Examiner—Rehana Perveen
(74) Attorney, Agent, or Firm—Blakely, Sokoloff, Taylor & Zafman LLP

(57) ABSTRACT

A communication system is disclosed. The system includes an interface register having a plurality of communication and function bits to manage communication between video BIOS and graphics driver.

13 Claims, 4 Drawing Sheets

ENABLING COMMUNICATION BETWEEN VIDEO BIOS AND GRAPHICS DRIVERS

BACKGROUND

The present invention relates to Basic Input/Output System (BIOS). More particularly, the invention relates to communication between the video BIOS and the graphics drivers.

The video Basic Input/Output System (BIOS) must operate with a variety of operating systems and versions of operating systems. But display switching requirements and capabilities of these operating systems, for example, are often conflicting. To alleviate these conflicting requirements and capabilities, display switching in the video BIOS may be restricted to a subset of functions common to all operating systems. However, the video BIOS may not be able to ascertain what operating system (OS) is loaded on the system (if any). The video BIOS may not be able to query operating systems directly because graphics drivers do not run in System Management Mode (SMM). Moreover, because the video BIOS is called in the (SMM), the video BIOS may not be able to communicate with driver software when the video BIOS is called for display configuration. Further, it may not be safe for the video BIOS to write to memory that is driver-readable on exit from SMM. For example, since the video BIOS has no knowledge of how the memory is used by the driver software, it may not be practical for the video BIOS to read memory which was written by graphics drivers. Once the operating system has been loaded, the video BIOS often does not have access to local memory or graphics-mapped system memory.

DETAILED DESCRIPTION

In recognition of the above-stated difficulties with an existing communication configuration between video Basic Input/Output System (BIOS) and graphics drivers, the present invention describes embodiments for enabling enhanced communication between video BIOS and graphics drivers. Consequently, for purposes of illustration and not for purposes of limitation, the exemplary embodiments of the invention are described in a manner consistent with such use, though clearly the invention is not so limited.

Hot keys on mobile and other systems with integrated keyboard and display may be used to call video BIOS in a System Management Mode (SMM) to change the display configuration. For example, the display configuration may include a configuration parameter that determines which graphics devices are displaying images. However, under many operating systems, a graphics code is designed for the graphics driver rather than the video BIOS. The graphics code controls features that depend on the current display configuration. The video BIOS therefore needs to inform the graphics driver of the change in display which starts in the SMM state. However, as stated above, the graphics drivers do not execute in the SMM state. Moreover, communication between the SMM state and other non-SMM states (when graphics drivers do run) through memory space may present problems.

Accordingly, the present embodiments provide communication and handoff between video BIOS and graphics drivers using communication bits in an interface register. In one embodiment, the interface register may reside in the graphics chipset such as Graphics Memory Controller Hub (GMCH). The present embodiments also provide a mechanism for the video BIOS either to directly support graphics device switching/configuration, or involve graphics driver software as a primary vehicle for supporting graphics device switching even when there is no operating system support for device switching/configuration. Hence, the video BIOS may set or clear bits in the interface register, which may be read on exit from SMM by the operating-system-specific drivers. The junction where the graphics driver is active and able to read these bits varies by operating system. However, many operating systems provide some periodic interval where these bits may be read. The graphics drivers in turn provide continually updated configuration information to the video BIOS in the same register, so that the video BIOS may take over the complete switching process when conditions require. An example of a condition that meets this requirement is a full screen Disk Operating System (DOS).

Figure 1:
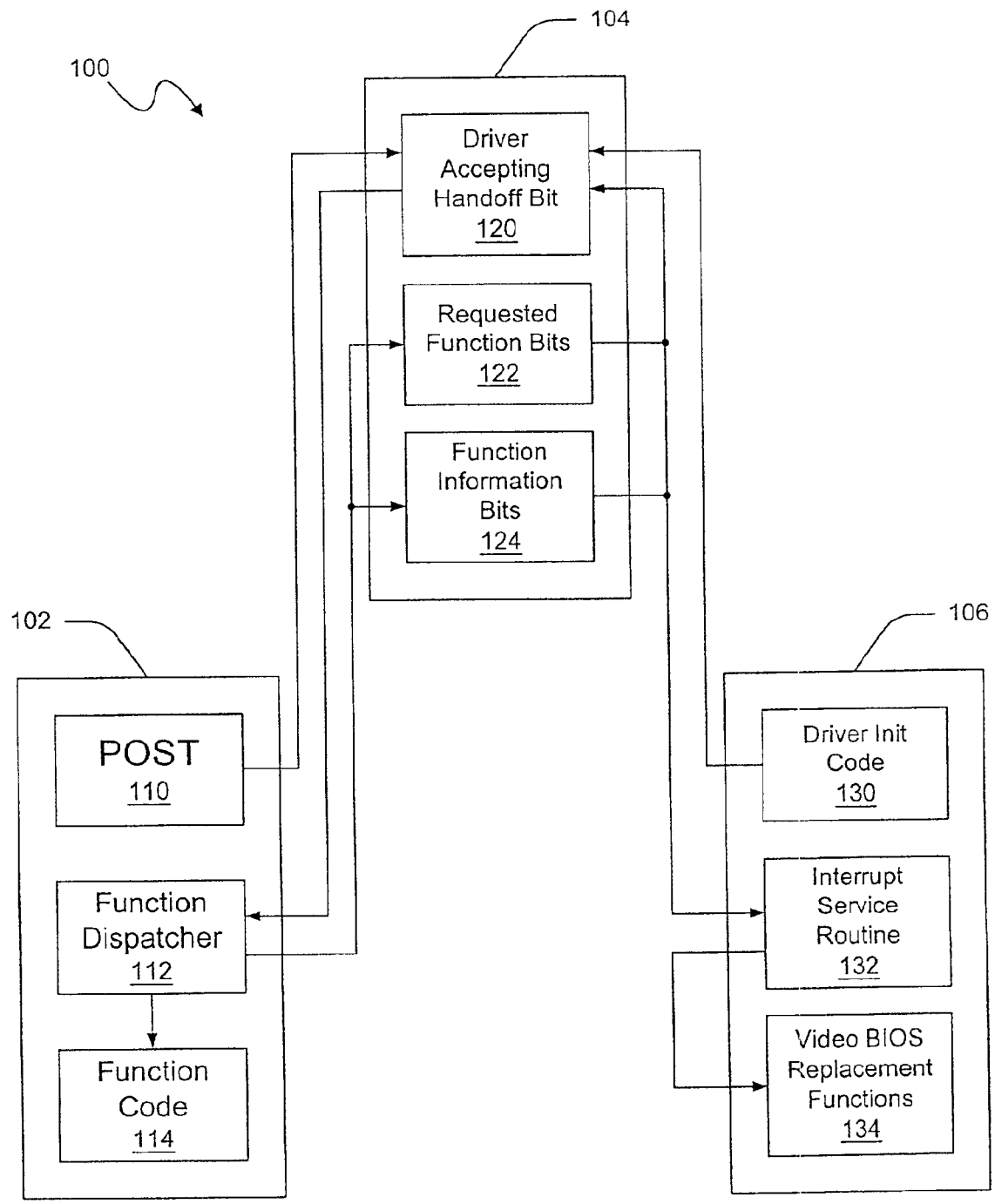
FIG. 1 is a block diagram of a communication system between the video BIOS and the graphics driver in accordance with an embodiment of the present invention.

A communication system 100 between the video BIOS 102 and the graphics driver 106 is illustrated in FIG. 1 according to an embodiment of the present invention. The system 100 includes an interface register 104 that enables enhanced communication and handoff between the video BIOS 102 and the graphics driver 106 using communication bits in the register 104.

Communication between the video BIOS 102 and the graphics driver 106 starts when power-up self-test (POST) 110 clears communication bits such as a handoff bit (i.e. Driver_Accepting_Handoff bit) 120 in the interface register 104 before booting into DOS. In one embodiment, the interface register 104 may include a Memory-Mapped Input/Output (MMIO) register. Calls to the video BIOS 104 at this time may be handled entirely by the video BIOS, 104 since the video BIOS 104 detects that the state of the handoff bit 120 is cleared. When the driver 106 is ready to accept handoff function calls from the video BIOS 104, the driver initialization code 130 sets the cleared handoff bit 120. A function dispatcher 112 in the video BIOS 102 performs function calls by calling the function code 114. The setting of the handoff bit 120 may be done after the interrupt service routine 132 that processes the communication bit has been installed.

On some predetermined functions, when the video BIOS 102 is called with the handoff bit 120 already set, the video BIOS 102 may not perform the code to complete the junction request. Instead, the function dispatcher 112 in the video BIOS 104 may set the appropriate communication bits 122, 124 to inform the driver 106 to complete the function requested. The appropriate communication bits 122, 124 include requested function bits 122 and function information bits 124. After the communication bits 122, 124 have been set, the video BIOS 102 may return with a successful status in the function code 114. This mechanism may even be used in Advance Power Management (APM) hot keys while under the Windows 9X operating system. This mechanism may be needed because the video BIOS 102 does not have the resource control or information to perform these selected functions while under the Windows operating system.

The interrupt service routine 132 in the driver 106 may check if the driver 106 has activated the handoff bit 120. If not, the routine 132 may continue on. If the handoff bit 120 has been set, the driver 106 may use the communication bits 122 to determine if a function call is requested by the video BIOS 102. If a function request has been made, the appropriate function may be called. Other communication bits 124 are used to help with setting up the function call. The interrupt service routine 132 may call the video BIOS 102 replacement functions 134 to replace any functions called by the video BIOS 102.

Figure 2:
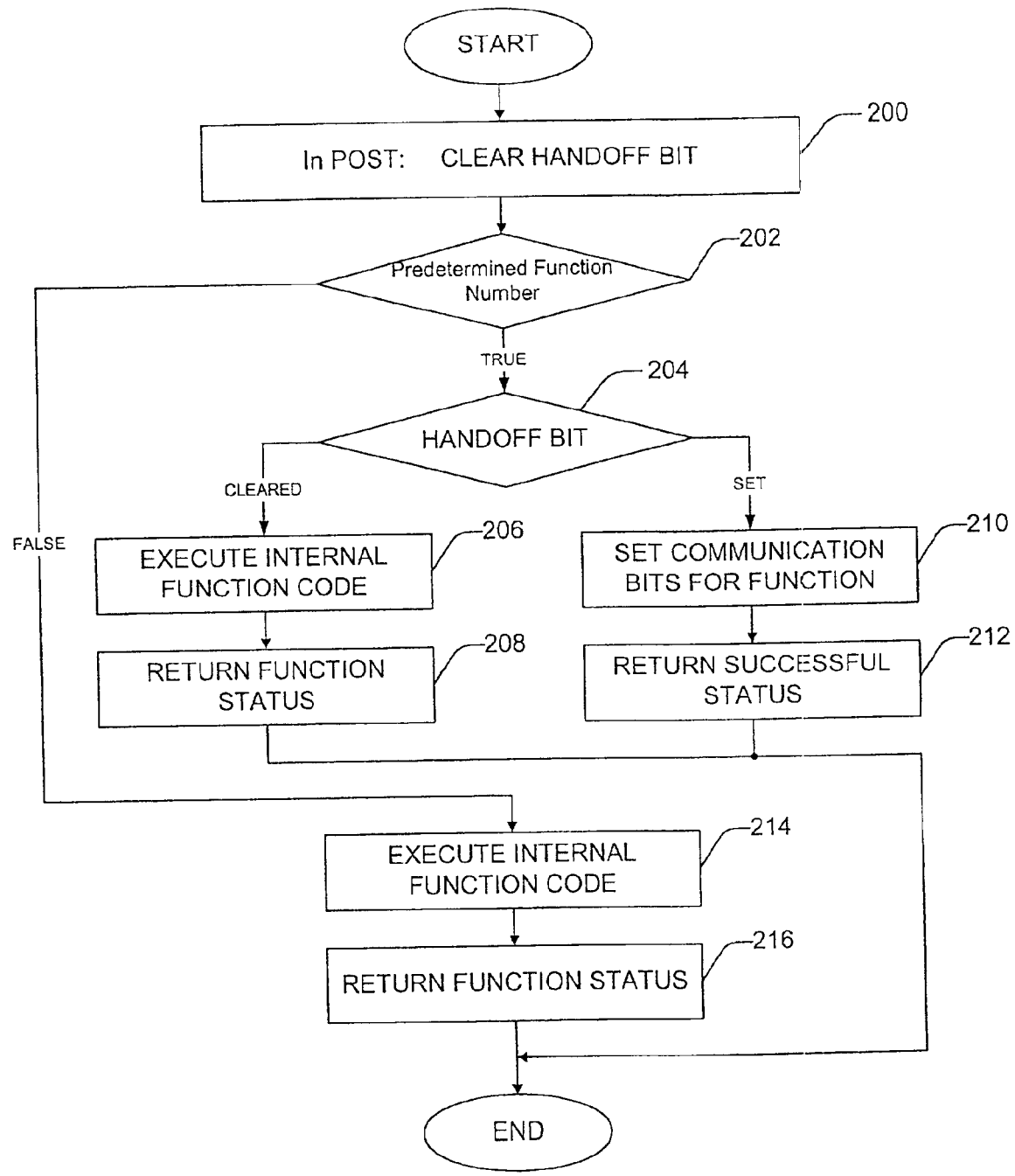
FIG. 2 illustrates a process in video BIOS for enabling communication between the video BIOS and the graphics driver according to an embodiment of the present invention.
Figure 3:
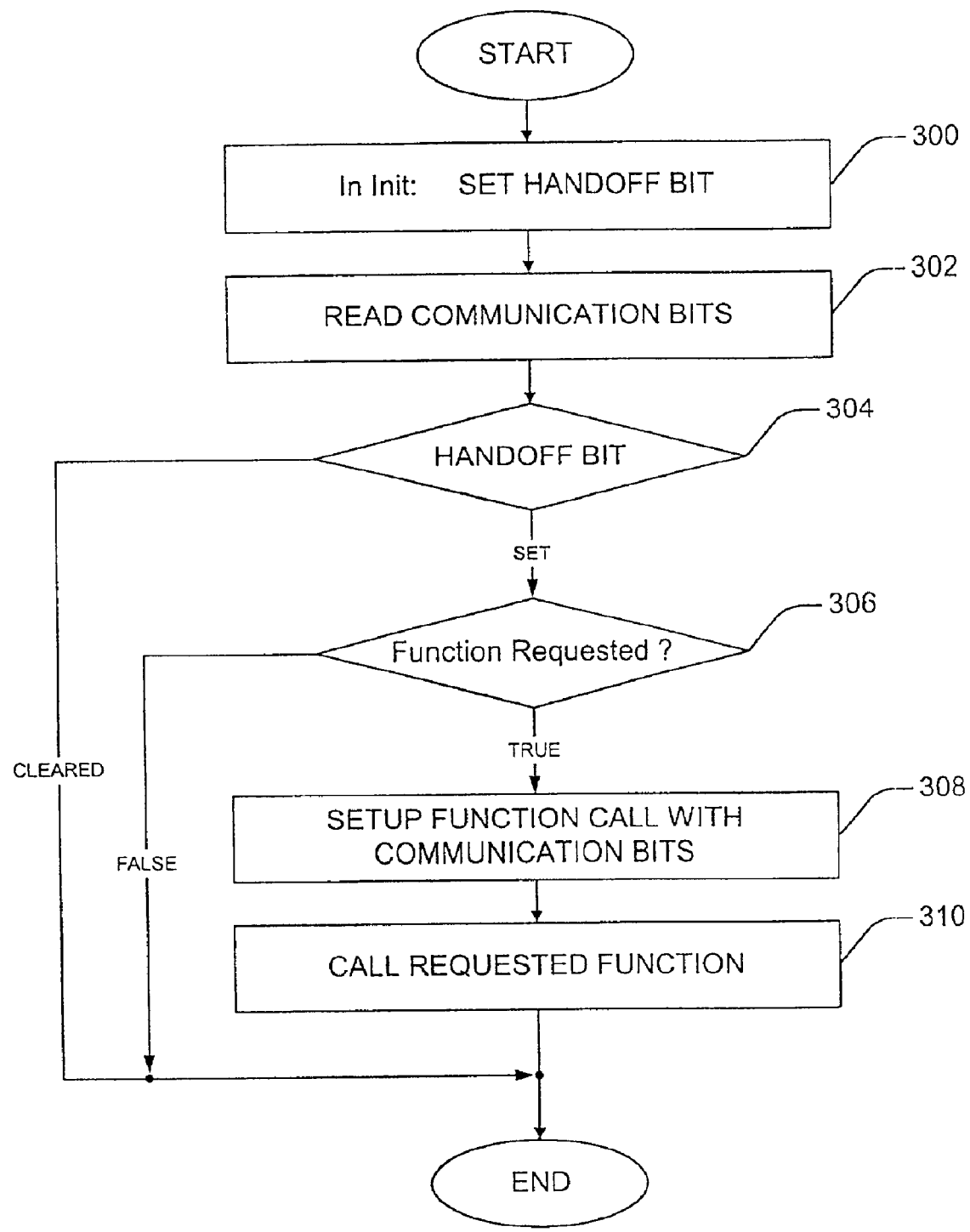
FIG. 3 illustrates a process in a graphics driver for enabling communication between the video BIOS and the graphics driver according to an embodiment of the present invention.

A process for enabling communication between the video BIOS and the graphics driver is illustrated as flowcharts in FIGS. 2 and 3 according to an embodiment of the present invention. FIG. 2 shows a technique implemented in the video BIOS. FIG. 3 shows a technique implemented in the graphic driver.

In the illustrated embodiment of FIG. 2, communication bits such as a handoff bit (i.e. Driver_Accepting_Handoff bit) is initially cleared in POST, at 200. Following operations may then be performed by a function dispatcher. If a predetermined function number is detected (at 202), the handoff bit is examined (at 204) to determine whether the bit is cleared or set. If the handoff bit is cleared, internal function code is executed (at 206), and the function status is returned (at 208). If the handoff bit is set, communication bits for the function are set (at 210), and the successful status is returned (at 212). However, if the predetermined function number is not detected (at 202), internal function code is executed (at 214), and the function status is returned (at 216).

In the illustrated embodiment of FIG. 3, the handoff bit (i.e. Driver_Accepting_Handoff bit) is set by the graphics driver initialization code, at 300. Following operations may then be performed by an interrupt service routine. The driver interrupt service routine reads communication bits, at 302. The handoff bit is examined (at 304) to determine whether the bit is cleared or set. If the handoff bit is set, the function is checked to determine if that function is the requested function, at 306. If the function is the requested function, the function call is setup with communication bits, at 308. The requested function is then called at 310.

Figure 4:
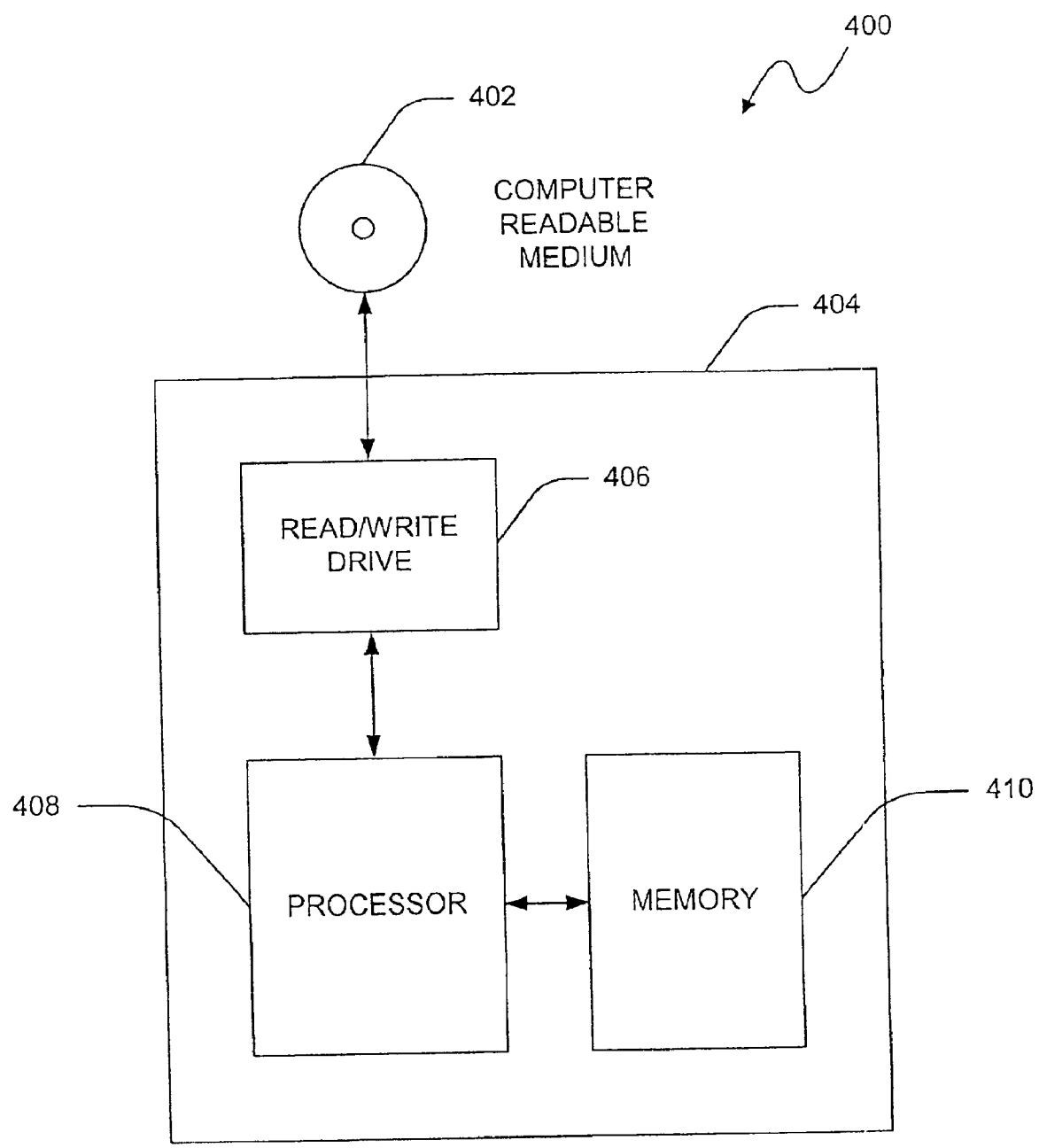
FIG. 4 is a block diagram of a processor-based system which may execute codes residing on a computer readable medium.

FIG. 4 is a block diagram of a processor-based system 400 which may execute codes residing on the computer readable medium 402. The codes are related to communication and handoff process between the graphics device and the video BIOS described in FIGS. 1 through 3. In one embodiment, the computer readable medium 402 may be a fixed medium such as read-only memory (ROM) or a hard disk. In the case of ROM, the code may reside in BIOS. In the case of hard clisk, the code may reside in operating system. In another embodiment, the medium 402 may be a removable medium such a floppy disk or a compact disk (CD). A read/write drive 406 in the computer 404 reads the code on the computer readable medium 402. The code is then executed in the processor 408. The processor 408 may access the computer main memory 410 to store or retrieve data.

Advantages of using communication bits to provide communication and handoff between the video BIOS and the graphic driver include enabling communication even when the operating system does not support such communication. For example, utilization of communication bits enables display switching even when the operating system does not support display switching or even when there is no driver loaded. Accordingly, without such a communication mechanism, the relationship between the video BIOS and the graphics driver may have to be configured differently in a mobile computer system versus desktop systems. By using the communication register according the present embodiments, the mobile and desktop systems may use common graphics drivers.

There has been disclosed herein embodiments for enabling communication and handoff between video BIOS and the graphics drivers using communication bits in an interface register. Enabling of the communication and handoff may facilitate interface between the video BIOS and graphics drivers so that the video BIOS may either directly support graphics device switching/configuration, or involve graphics driver software as a primary vehicle for supporting graphics device switching even when there is no operating system support for device switching/configuration.

While specific embodiments of the invention have been illustrated and described, such descriptions have been for purposes of illustration only and not by way of limitation. Accordingly, throughout this detailed description, for the purposes of explanation, numerous specific details were set forth in order to provide a thorough understanding of the present invention. It will be apparent, however, to one skilled in the art that the system and method may be practiced without some of these specific details. In other instances, well-known structures and functions were not described in elaborate detail in order to avoid obscuring the subject matter of the present invention. Accordingly, the scope and spirit of the invention should be judged in terms of the claims which follow.

What is claimed is:

1. A communication system, comprising:
   an interface register including a plurality of communication bits and function bits, said plurality of communication bits to manage communication between video BIOS and graphics driver,
   a function dispatcher to perform functions calls in the video BIOS using said plurality of function bits when the graphics driver is ready to accept function calls; and
   an interrupt service routine to determine when the graphics driver has activated said communication bits; and
   a power-up self-test (POST) to clear said communication bits before booting into Disk Operating System (DOS).

2. The system of claim 1, further comprising:
   a driver initialization code to activate said communication bits when the graphics driver is ready to accept handoff function calls from the video BIOS.

3. The system of claim 1, further comprising:
   a plurality of replacement functions to replace any functions called by the video BIOS when commanded by said interrupt service routine.

4. The system of claim 1, wherein said interface register includes a memory-mapped input/output (MMIO) register.

5. The system of claim 1, further comprising:
   a function code to perform function request when commanded by said function dispatcher.

6. A method, comprising:
   clearing communication bits during power-up self-test (POST);
   setting the communication bits during initialization of graphics driver,
   where said clearing and setting enables communication between video BIOS and the graphics driver; and executing internal function code and returning function status when a predetermined function request is detected and the handoff bit is cleared.

7. The method of claim 6, wherein the communication bits include a handoff bit.

8. The method of claim 6, further comprising:

setting the communication bits for function and returning successful status when the predetermined function request is detected and the handoff bit is activated.

9. The method of claim 6, further comprising:

executing internal function code and returning function status when the predetermined function request is not detected.

10. The method of claim 7, further comprising:

reading the communication bits;

setting up function calls with the communication bits when the handoff bit is set and a function call is requested; and calling the requested function.

11. A computer readable medium containing executable instructions which, when executed in a processing system, causes the system to enable communication between video BIOS and graphics driver, comprising:

clearing communication bits during power-up self-test (POST); and setting the communication bits during initialization of the graphics driver; and executing internal function code and returning function status when a predetermined function request is detected and the handoff bit is cleared.

12. The medium of claim 11, wherein the communication bits include a handoff bit.

13. The medium of claim 12, further comprising:

reading the communication bits;

setting up function calls with the communication bits when the handoff bit is set and a function call is requested; and calling the requested function.

* * * * *

UNITED STATES PATENT AND TRADEMARK OFFICE
CERTIFICATE OF CORRECTION

PATENT NO. : 6,880,077 B2
DATED : April 12, 2005
INVENTOR(S) : Saw-Chu et al.

It is certified that error appears in the above-identified patent and that said Letters Patent is hereby corrected as shown below:

Column 2,
Line 59, delete "junction" and insert -- function --.

Signed and Sealed this

Fifth Day of July, 2005

JON W. DUDAS
*Director of the United States Patent and Trademark Office*